United States Patent
Onda et al.

(10) Patent No.: US 11,656,340 B2
(45) Date of Patent: May 23, 2023

(54) LIDAR DEVICE

(71) Applicant: DENSO CORPORATION, Kariya (JP)

(72) Inventors: Kazuhisa Onda, Kariya (JP); Teiyuu Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 600 days.

(21) Appl. No.: 16/778,263

(22) Filed: Jan. 31, 2020

(65) Prior Publication Data

US 2021/0239803 A1    Aug. 5, 2021

(51) Int. Cl.
*G01S 7/481* (2006.01)
*G01S 17/42* (2006.01)
*G01S 17/08* (2006.01)

(52) U.S. Cl.
CPC .......... *G01S 7/4817* (2013.01); *G01S 7/4815* (2013.01); *G01S 7/4816* (2013.01); *G01S 17/08* (2013.01); *G01S 17/42* (2013.01)

(58) Field of Classification Search
CPC .......... G01S 17/08; G01S 17/10; G01S 17/42; G01S 7/4815; G01S 7/4816; G01S 7/4817
See application file for complete search history.

(56) References Cited

U.S. PATENT DOCUMENTS

| | | | |
|---|---|---|---|
| 2011/0260909 A1* | 10/2011 | Ogawa | G01S 17/931 |
| | | | 342/70 |
| 2017/0305360 A1 | 10/2017 | Zajac | |
| 2018/0094793 A1 | 4/2018 | Yokota et al. | |
| 2020/0341119 A1* | 10/2020 | Smith | G01S 7/4815 |
| 2022/0163788 A1* | 5/2022 | Horiguchi | G01S 17/931 |

FOREIGN PATENT DOCUMENTS

| | | | | |
|---|---|---|---|---|
| JP | H07-92256 A | | 4/1995 | |
| JP | H0792256 | * | 4/1995 | G01S 17/93 |
| JP | 2020-204600 A | | 12/2020 | |

OTHER PUBLICATIONS

U.S. Appl. No. 16/778,781, filed Jan. 31, 2020, Kimura et al.

* cited by examiner

*Primary Examiner* — Mohammed S Rahaman
(74) *Attorney, Agent, or Firm* — Posz Law Group, PLC

(57) ABSTRACT

A LIDAR device includes a light source, a mirror, a rotatable shaft, and a motor. The light source configured to emit a light beam having a predetermined light beam width for scanning a scanning zone. The rotatable shaft has a center axis parallel to a reflective surface of the mirror and is connected to a back surface of the mirror. The motor is configured to rotate the shaft to cause the mirror to swing between a first position and a second position. The light source and the mirror are arranged to have a positional relationship such that a mirror center is aligned with the light beam center when the mirror is at the first position, and the mirror center shifts within a motion area when the mirror is swinging between the first position, non-inclusive, and the second position, inclusive.

4 Claims, 18 Drawing Sheets

LIDAR DEVICE

TECHNICAL FIELD

The present disclosure relates to a LIDAR device to calculate a distance to an object.

BACKGROUND ART

A LIDAR, which stands for Light Detection and Ranging, is a remote sensing method to measure distances to object in a scanning area. Such a LIDAR system has been well used in a variety of fields including in the field of autonomous driving area. LIDAR system typically uses a light emitter, a light receiver, and a mirror to reflect the emitted light toward the scanning area. The scanning mirror is usually used by rotating the mirror in one direction to scatter laser beams around a surrounding area.

SUMMARY

One aspect of the present disclosure is a LIDAR device for measuring a distance to an object in a scanning zone. The device includes a light source, a mirror, a rotatable shaft, and a motor. The light source is configured to emit a light beam having a predetermined light beam width for scanning the scanning zone. The mirror has a reflective surface and a back surface opposite to the reflective surface. The mirror is configured to reflect, with the reflective surface, the light beam emitted from the light source toward the scanning zone. The rotatable shaft has a center axis parallel to the reflective surface of the mirror. The shaft is connected to the back surface of the mirror.

The motor is configured to rotate the shaft to cause the mirror to swing between a first position corresponding to one end of the predetermined scanning zone and a second position corresponding to another end of the predetermined scanning zone, an angle of incidence of the light beam to the reflective surface being greater when the mirror is at the first position than when the mirror is at the second position.

When a light beam center is defined as a center of the light beam width of the light beam from the light source to the reflective surface, then a motion area is defined as one side of the light beam center that includes the center axis of the shaft.

The light source and the mirror are arranged to have a positional relationship such that, when viewed in a direction along the center axis of the shaft, a mirror center, which is defined as a point on the reflective surface closest to the center axis of the shaft, is aligned with the light beam center when the mirror is at the first position, and the mirror center shifts within the motion area when the mirror is swinging between the first position, non-inclusive, and the second position, inclusive.

BRIEF DESCRIPTION OF DRAWINGS

The above and other objectives, features and advantages of the present disclosure will become more apparent from the following detailed description made with reference to the accompanying drawings.

DESCRIPTION OF EMBODIMENTS

Figure 1:
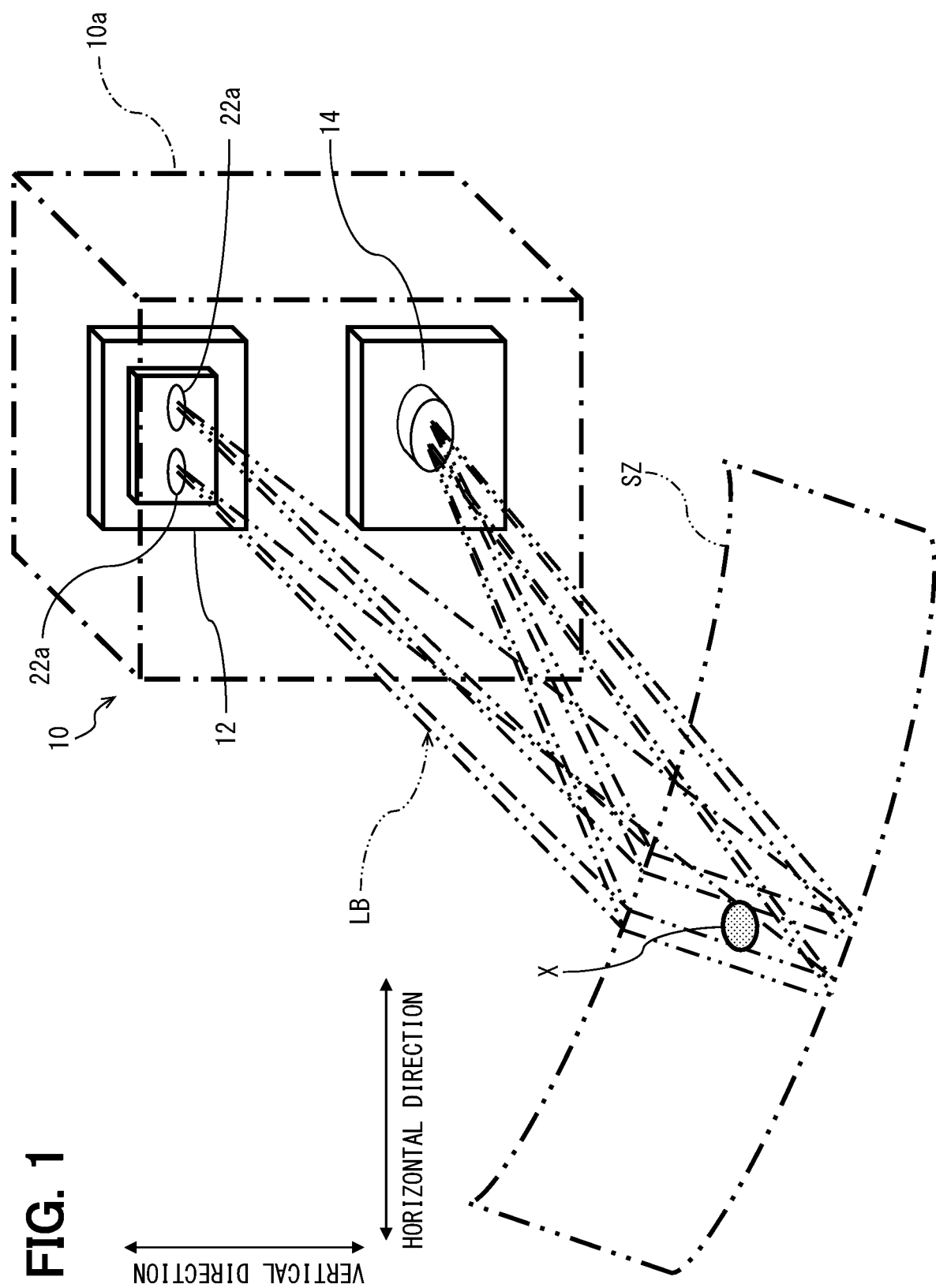
FIG. 1 is a schematic view of a LIDAR device according to a first embodiment.

Hereinafter, a plurality of embodiments of the present disclosure will be described with reference to the drawings. In the following embodiments, the same or equivalent parts are denoted by the same reference numerals as each other, and explanations will be provided to the same reference numerals for simplifying descriptions. Furthermore, in the following embodiments, a laser imaging detection and ranging (LIDAR) device is mounted in a vehicle such as an automotive, but the LIDAR device 1 may be mounted in any kind of vehicles such as motorbikes, airplanes, ships, drones, or the like.

First Embodiment

Figure 2:
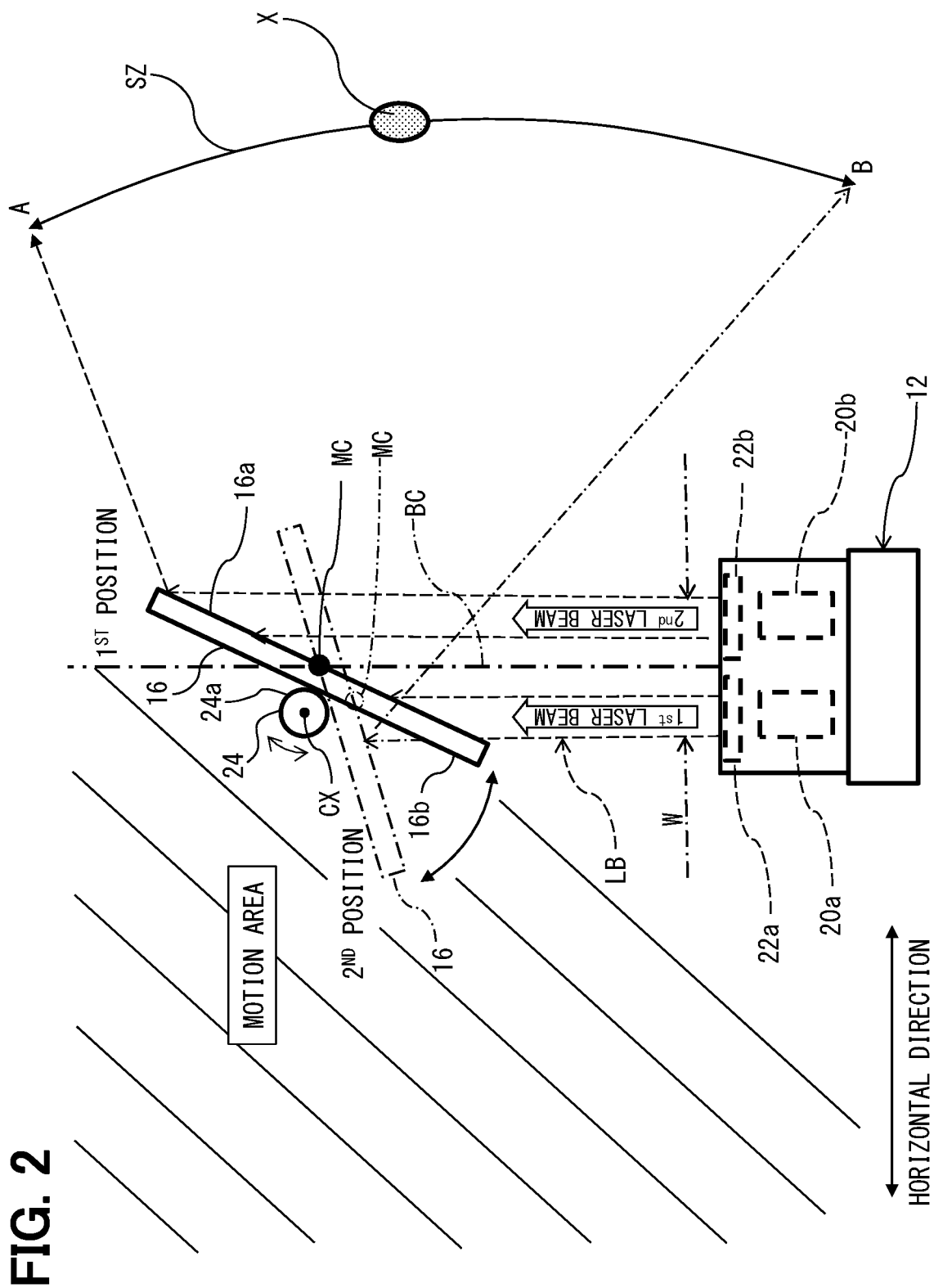
FIG. 2 is a top view showing a positional relationship between a emitting module and a scanning mirror.
Figure 3:
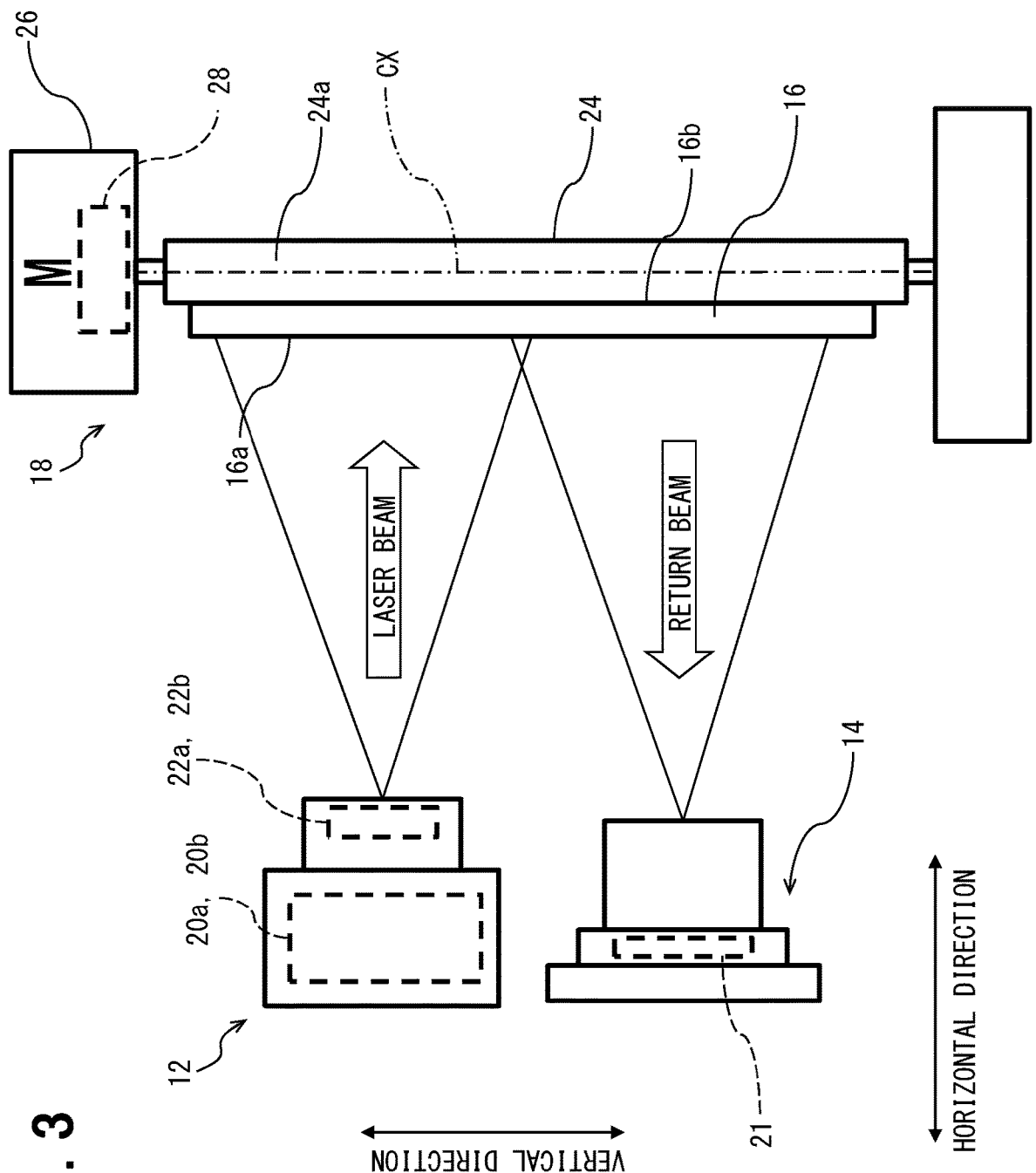
FIG. 3 is a side view of the LIDAR device.

FIGS. 1 to 3 show a schematic view of the LIDAR device 10 according to the first embodiment. The LIDAR device 10 is configured to calculate a distance to an object X in a scanning zone SZ using time-of-flight (ToF) techniques. The LIDAR device 10 basically includes a light emitting module 12, a light receiving module 14, a scanner module 18 (see FIG. 3), and a motor controller 50. Calculation of a distance to an object X is performed by a controller 21 that is integrally disposed in the light receiving module 14, as will described later. It should be noted that the scanner module 18 is not illustrated in FIG. 1 for explanatory purposes.

The LIDAR device 10 is formed as a single component housed in a box-like case 10a as illustrated in FIG. 1. As shown in FIG. 3, in this embodiment, the light emitting module 12 and the light receiving module 14 are arranged in a direction along a vertical direction (an up-down direction) of a vehicle to which the LIDAR device 10 is mounted. In other words, the light emitting module 12 and the light receiving module 14 are arranged in a direction along rotatable shaft 24 of scanner module 18. More specifically, the light emitting module 12 is disposed above the light receiving module 14. However, the arrangement of the light emitting module 12 and the light receiving module 14 is not necessarily limited to this example. For example, the light emitting module 12 and the light receiving module 14 may be arranged in a direction along a horizontal or a slanted direction of the vehicle.

The light emitting module 12, or a light source, is configured to emit a laser light toward a scanning mirror 16 of the scanner module 18. As shown in FIG. 2, the light emitting module 12 includes two pairs of light emitters 20a, 20b and transmitter lenses 22a, 22b. Each of the light emitters 20a, 20b is, for example, a semiconductor laser diode configured to emit a pulsed laser. Each of the light emitters 20a, 20b is electrically connected to the controller 21 and configured to emit a laser light when the light emitting module 12 receives an emission control signal from the controller 21. Therefore, the emission timing of the light emitters 20a, 20b are controllable through the emission control signals output from the controller 21.

The light emitting module 12 is further configured to output an actual emission timing to the controller 21. The actual emission timing is a timing at which the light emitting module 12 actually emits a light beam. As will described below, the actual emission timing is used for compensating an error generated when calculating a distance by the controller 21.

Each of the transmitter lens 22a, 22b is a lens configured to focus the pulsed laser emitted from the light emitter to form a vertical line (or a vertical band) extending in a direction along the vertical direction of the vehicle (see FIG. 1). That is, the LIDAR device 10 adopts the 1D line-scanning method which performs a horizontal scanning with a vertical-line laser beam.

In this embodiment, the two pairs of the light emitters 20a, 20b and the transmitter lenses 22a, 22b are arranged in the horizontal direction. Hereinafter, a laser beam emitted from one (the left pair 20a, 22a in FIG. 2) of the two pairs of the light emitters and the transmitter lenses is referred to as a first laser beam, and a laser beam emitted from the other one (the right pair 20b, 22b in FIG. 2) of the two pairs of the light emitters and the transmitter lenses is referred to as a second laser beam. Then, the first and second laser beams emitted from the two light emitters 20a, 20b and focused through the transmitter lenses 22a, 22b are collectively referred to as a light beam band LB.

As shown in FIG. 2, the light beam band LB of the two light emitters 20a, 20b has a light beam width W which is a width in a direction perpendicular to a light travelling direction when viewed from above. Then, a light beam center BC is defined as a center of the light beam width W of the light beam band LB. More specifically, the light beam center BC is a center line extending along center points of the light beam width W in a direction perpendicular to the light travelling direction when viewed above.

The scanner module 18 includes the scanning mirror 16, a rotatable shaft 24, a driving motor 26, and an angle sensor 28. The rotatable shaft 24 is a shaft configured to rotate about a center axis CX. In this embodiment, the center axis CX extends along a direction in parallel with the vertical direction of the vehicle. The rotatable shaft 24 has a columnar shape with a specified diameter. The side surface 24a of the rotatable shaft 24 is connected to the mirror 16.

The scanning mirror 16 is a mirror configured to reflect the laser beam toward the scanning zone SZ directly or indirectly through another one or more mirror. Furthermore, the scanning mirror 16 in this embodiment is configured to reflect the return beam reflected by an object X toward the light receiving module 14. That is, the scanning mirror 16 serve as both a transmitter mirror and a receiver mirror.

The scanning mirror 16 is a plate-like member in this embodiment and includes a reflective surface 16a and a back surface 16b that is opposite to the reflective surface 16a. The back surface 16b of the scanning mirror 16 is connected to the side surface of the rotatable shaft 24. Thus, as shown in FIG. 2, the reflective surface 16a is away from the center axis CX of the rotatable shaft 24 with a predetermined distance (i.e., the radius of the rotatable shaft 24), and as a result, the scanning mirror 16 is rotated around, not about, the center axis CX (i.e., swinging).

Figure 5:
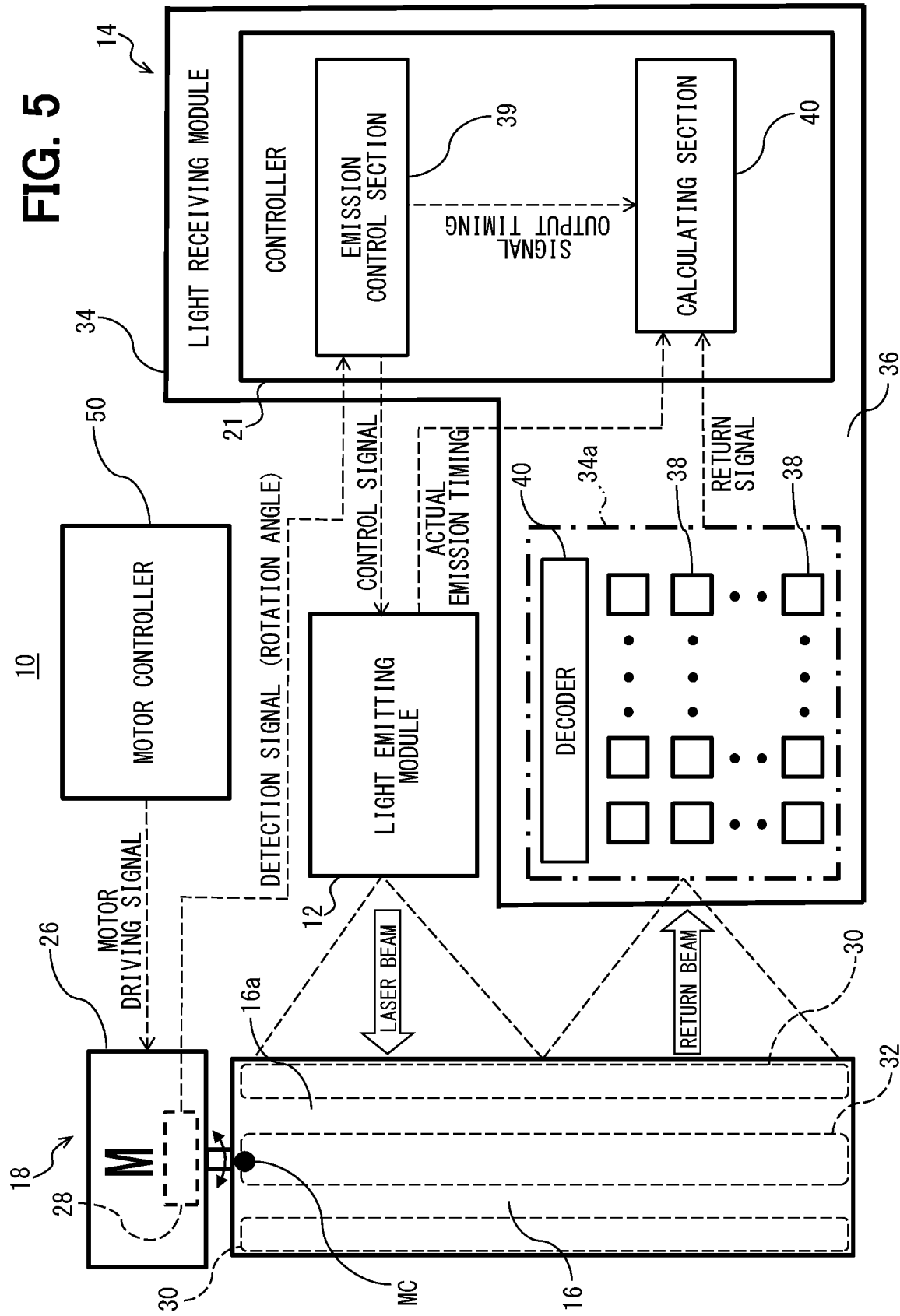
FIG. 5 is a block diagram of the LIDAR device.

In this embodiment, the reflective surface 16a has a rectangular shape when viewed from the front (see FIG. 5). The reflective surface 16a is elongated in a direction along the vertical direction. Referring to FIG. 5, two edge portions 30 of the reflective surface 16a are defined as portions that include elongated sides (i.e., the lengths of the reflective surface 16a) of the reflective surface 16a extending in the direction along the vertical direction. Also, a center portion 32 of the reflective surface 16a is defined as a portion that is an center area of the reflective surface 16a between the two edge portions 30. Then, a mirror center MC is defined as a point on the reflective surface 16a, when viewed in a direction along the center axis CX (i.e., the vertical direction), that is closest to the center axis CX of the rotatable shaft 24, as shown in FIG. 2. In this embodiment, the mirror center MC is a center point between the two edge portions 30 when viewed in the direction along the center axis CX. In other words, the mirror center MC is a center point of the width of the reflective surface 16a.

The driving motor 26 is an electric motor configured to rotate the rotatable shaft 24 about the center axis CX. The driving motor 26 is electrically connected to the motor controller 50 and the operation of the driving motor 26 is controlled by motor driving signals output from the motor controller 50. The motor controller 50 is, for example, an electronic control unit (ECU) that includes at least one processor and one memory. The memory includes random access memory, read only memory, flash memory, or a combination of these. The memory has stored thereon instructions which, when executed by the processor, cause the processor to control the driving motor 26.

The motor controller 50 is configured to control the driving motor 26 to operate alternately in opposite directions. As a result, the rotatable shaft 24 is rotated by the motor back and forth so that the scanning mirror 16 swings between a first position and a second position in a predetermined scanning angle range. That is, the scanning mirror 16 periodically swings between the first position and the second position.

Figure 4:
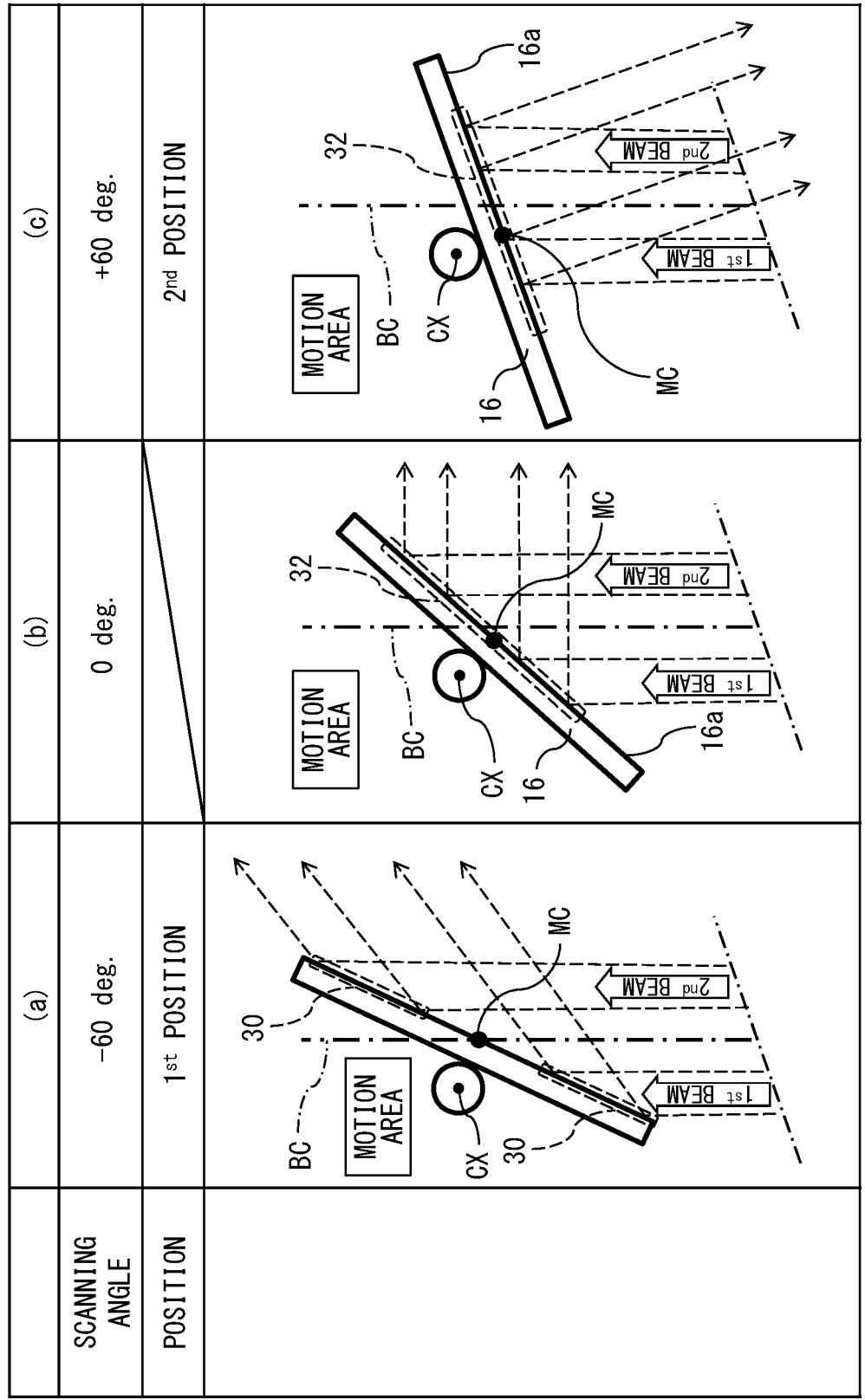
FIG. 4 is a diagram showing the reflection of the laser beam by the scanning mirror at −60 deg. in (a), 0 deg. in (b), and +60 deg. in (c).

As shown in FIG. 2, the first position of the scanning mirror 16 is a position corresponding to one end A of the scanning zone SZ and the second position of the scanning mirror 16 is the other end B of the scanning zone SZ. As shown in FIG. 4, an angle of incidence of the light beam to the reflective surface 16a is greater when the mirror is at the first position than when the mirror 16 is at the second position. In this embodiment, the scanning angle range is set to 120 degrees (i.e., −60°≤scanning angle θ≤+60°, and the scanning angle θ is −60° when the scanning mirror 16 is at the first position and the scanning angle θ is +60° when the scanning mirror 16 is at the second position (see FIG. 4).

Referring to FIG. 2, a motion area is defined as one side of the light beam center BC that includes the center axis CX of the shaft 24 when viewed in a direction along the center axis CX (the hatched area in FIG. 2). Then, the light emitting module 12 and the scanning mirror 16 are arranged to have a positional relationship such that, when viewed in a direction along the center axis CX of the rotatable shaft 24, the mirror center MC is aligned with the light beam center BC when the mirror is at the first position (see FIG. 2 and (a) of FIG. 4). On the other hand, the mirror center MC shifts within the motion area when the mirror 16 is swinging between the first position, non-inclusive, and the second position, inclusive (see (b) and (c) in FIG. 4). In other words, the mirror center MC of the scanning mirror 16 moves within the motion area except when the scanning mirror 16 reaches the first position. Thus, the mirror center MC and the light beam center BC are offset from each other except when the mirror 16 is at the first position.

As shown in (a) of FIG. 4, when the scanning mirror 16 is at the first position, the first laser beam emitted from the left light emitter is reflected at the left edge portion 30 of the reflective surface 16a and the second laser beam emitted from the right light emitters is reflected at the right edge portion 30 of the reflective surface 16a. On the other hand, as shown in (c) of FIG. 4, when the scanning mirror 16 is at the second position, the first and second laser beams emitted from both the light emitters are reflected at the center portion 32 of the reflective surface 16a.

The scanner module 18 further includes the angle sensor 28 that detects rotation angles of the scanning mirror 16. The angle sensor 28 may be an optical sensor, a mechanical sensor, an ultrasonic sensor, or the like. The angle sensor 28 is configured to detect a rotation angle at a plurality of predetermined angle intervals during each rotation cycle of the scanning mirror 16 between the first position and the second position. In this embodiment, the angle sensor 28 is configured to detect each 0.1 degree of the rotation angle of the mirror 16 (i.e., the maximum angle resolution is 0.1°). However, the resolution of the angle sensor 28 is not necessarily limited to 0.1 degree, and may be 0.05 or 0.2 degree, for example.

Figure 6:
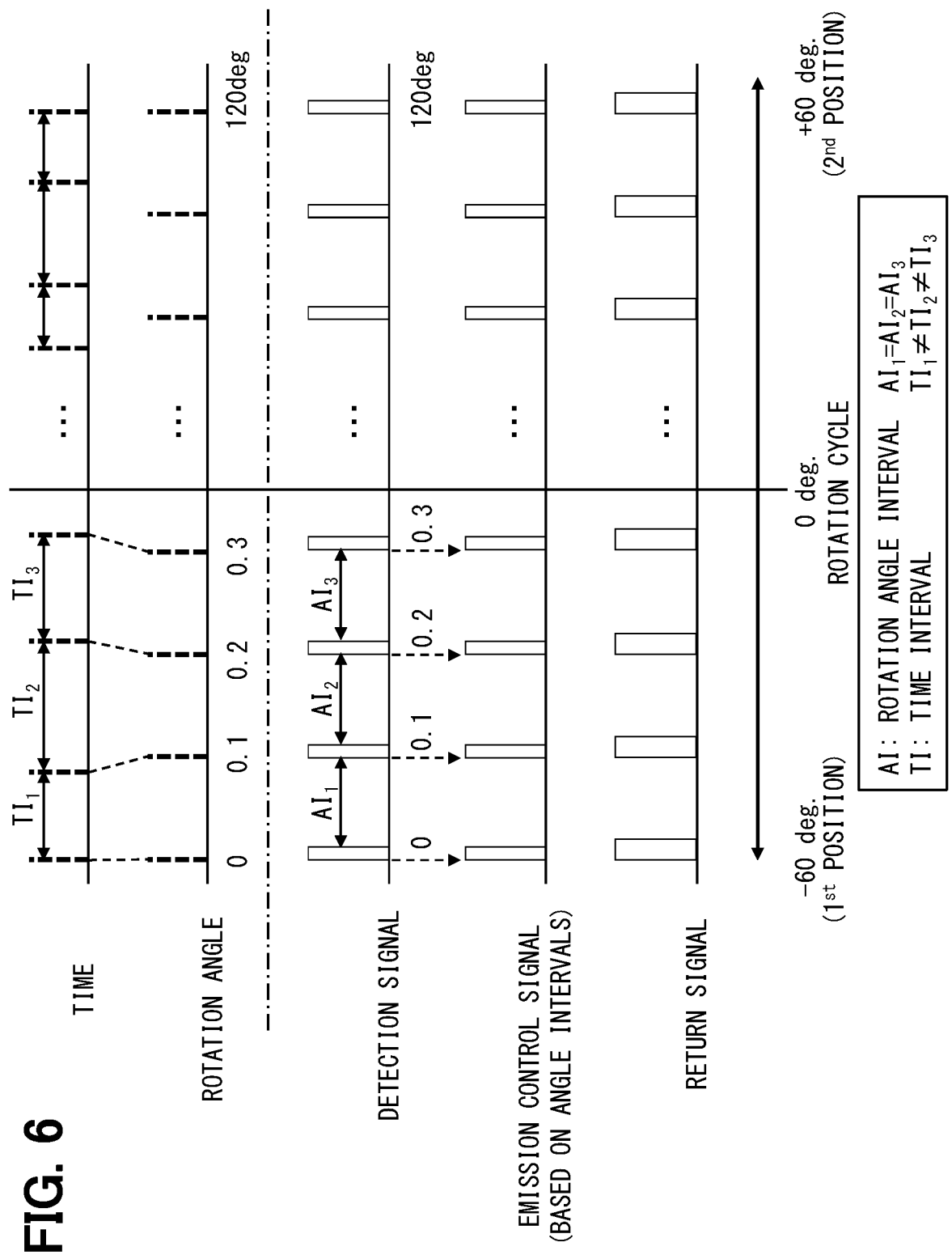
FIG. 6 is a timing chart of detection signals, emission control signals, and return signals according to the first embodiment.

The angle sensor 28 is connected to the controller 21 and is configured to output a detection signal indicative of the rotation angle of the mirror at the angle intervals (i.e., at 0.1 degree intervals). Inventors of the present disclosure have found that since the scanning mirror 16 is moved to swing between the first position and the second position, an acceleration is applied to the scanning mirror 16 during swinging. Therefore, the rotational speed of the scanning mirror 16 varies (does not maintain a constant value) during one rotation cycle of the scanning mirror 16. As a result, the rotation angle of the scanning mirror 16 is not counted by the angle sensor 28 at same time intervals, as shown in FIG. 6. That is, the angle sensor 28 outputs a detection signal at the same angle intervals, but different time intervals, to the controller 21.

The light receiving module 14 includes a light receiver 34 and the controller 21. The light receiver 34 includes an integrated circuit 36 having a plurality of light sensitive devices, and the controller 21 is provided within the integrated circuit 36 of the light receiver 34. In other words, the light receiver 34 and the controller 21 are integrally formed as a single module in this embodiment. In this embodiment, the plurality of light sensitive devices of the light receiver 34 are single photon avalanche diodes (SPADs) 38 which are formed as a 2-D SPAD array 34a by arranging the plurality of SPADs 38 in both columns and rows. Since the SPAD array 34a constitutes a digital circuit and therefore has a high angular resolution as compared with other light sensitive devices forming an analog type circuit. Hence, the light receiver 34 can detect a return beam at small rotation angle intervals such as 0.1 degree intervals. The light receiver 34 (the SPAD array 34a) outputs a return signal, which is a digital signal, in accordance with a return beam reflected by an object X to the controller 21 upon receiving the return beam. The light receiver 34 also includes a decoder 40 that is configured to enable diodes 38 in a column to receive a return beam.

The controller 21 in this embodiment is configured to control emission of laser beams by controlling the light emitting module 12. The controller 21 is further configured to calculate a distance to an object X based on the difference between the light emission timing at which the light emitting module 12 emitted a laser beam and the light receipt timing at which the light receiving module 14 received a return beam, as will described later. Since the controller 21 is implemented on the integrated circuit 36, which is a digital circuit, together with the light receiver 34 (the SPAD array 34a), the controller 21 is capable of performing the above-mentioned functions without a programmable processor.

FIG. 5 shows functional blocks of the controller 21. Although FIG. 5 shows the controller 21 having these functions, one or some of functions may be executed by one or more physically separated circuit. The controller 21 includes, as functional blocks, an emission control section 39 and a calculating section 40.

The emission control section 39 is configured to control the light emitting module 12 by outputting an emission control signal to the light emitting module 12. In this embodiment, the emission control section 39 is configured to output an emission control signal upon receiving a detection signal from the angle sensor 28 (see FIG. 6). Thus, the light emitting module 12 emits a laser beam each time the angle sensor 28 detects a rotation angle of the scanning mirror 16. In other words, the light emitting module 12 emits a laser beam at the same intervals as the angle intervals (i.e., 0.1 degree intervals). Furthermore, the emission control section 39 is configured to output a signal output timing to the calculating section 40. The signal output timing is a timing at which the emission control section 39 output the control signal to the light emitting module 12.

The calculating section 40 is configured to calculate a distance to an object X using the return signal from the light receiving module 14 and the signal output timing from the emission control section 39. More specifically, the calculating section 40 calculates a distance to an object X from the time difference between the signal output timing and the light receipt timing (i.e., the return signal) using the time-of-flight principle. Furthermore, the calculating section 40 is configured to receive the above-described actual emission timing from the light emitting module 12 (see FIG. 5). Then, the calculating section 40 is configured to correct the calculated distance using the actual emission timing. That is, there is a time lag after the controller 21 outputs the signal output timing until the light emitting module 12 actually emits a laser beam. Therefore, the controller 21 corrects the distance calculated from the signal output timing using the actual emission timing.

Figure 7:
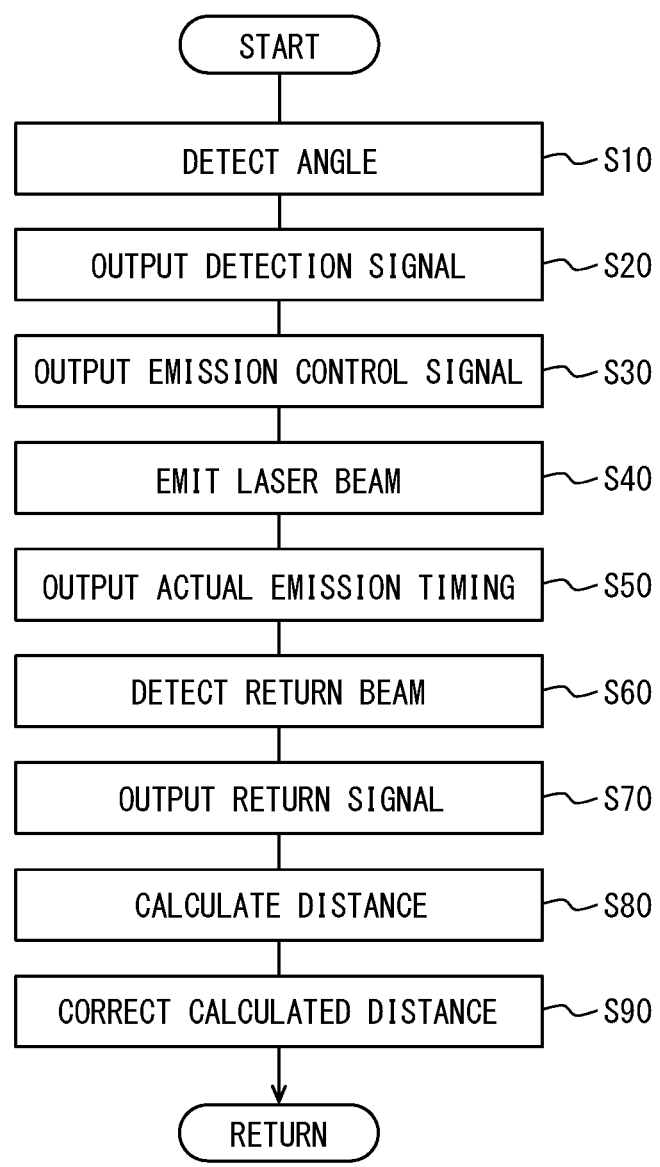
FIG. 7 is a flowchart performed by the LIDAR device according to the first embodiment.

FIG. 7 shows a flowchart executed by the LIDAR device 10 to calculate a distance to an object X. When the angle sensor 28 detects a rotation angle of the scanning mirror 16 at step S10, the angle sensor 28 outputs a detection signal indicative of the detected rotation angle to the controller 21 (the emission control section 39) at step S20. As described above, the angle sensor 28 detects a rotation angle at the predetermined rotation angle intervals (i.e., 0.1 degree intervals) although the rotational speed of the scanning mirror 16 varies between the first position and the second position. When the controller 21 receives the detection signal from the angle sensor 28, the controller 21 outputs an emission control signal to the light emitting module 12 at step S30.

When the light emitting module 12 receives the emission control signal, the light emitting module 12 emits a laser beam toward the scanning mirror 16 at step S40. The light emitting module 12 further outputs the actual emission timing to the controller 21 (the calculating section 40) at step S50 as a timing at which the light emitting module 12 actually emits the laser timing.

The emitted laser beam is reflected at the reflective surface 16a of the scanning mirror 16 and travels to the scanning zone SZ. Then, if the laser beam is reflected by an object X, the return signal comes back to the LIDAR device 10 and is reflected again by the reflective surface 16a of the scanning mirror 16 toward the light receiving module 14. When the return beam reaches the light receiving module 14, the light receiving module 14 (the SPAD array) detects the return beam at step S60, and then the light receiving module 14 outputs a return signal to the controller 21 (the calculating section 40) in response to receiving the return beam at step S70.

The controller 21 (the calculating section 40) calculates a distance to the object X using the signal output timing and the return signal at step S80. Then, the controller 21 (the calculating section 40) corrects the calculated distance using the actual emission timing at step S90.

As described above, the LIDAR device 10 according to the first embodiment includes the light emitting module 12 and the scanning mirror 16 that are arranged to have a positional relationship such that, when viewed in a direction along the center axis CX of the rotatable shaft 24, the mirror center MC is aligned with the light beam center BC when the mirror 16 is at the first position. The first position is defined as a position corresponding to the one end A of the scanning zone SZ, and the angle of incidence of the light beam to the reflective surface 16a has a maximum value in the scanning angle range when the scanning mirror 16 is at the first position. On the other hand, the mirror center MC shifts within the motion area when the mirror 16 is swinging between the first position, non-inclusive, and the second position, inclusive. The second position is defined as a position corresponding to the other end B of the scanning zone SZ, and the angle of incidence of the light beam to the reflective surface 16a has a minimum value in the scanning angle range when the scanning mirror 16 is at the second position.

Thus, since the light beam center BC is aligned with the mirror center MC when the scanning mirror 16 is at the first position, the first light beam and the second light beam are reflected at the edge portions 30 of the reflective surface 16a between which the mirror center MC is located. More specifically, as shown in (a) of FIG. 4, the first light beam and the second light beam are reflected at the left edge portion and the right edge portion of the reflective surface 16a, respectively, when the scanning mirror 16 is at the first position. Therefore, the width of the reflective surface 16a (the scanning mirror 16) can be minimized as long as the reflective surface 16a can receive the first and second light beams at the both edge portions 30 when the mirror 16 is at the first position. As a result, the size of the LIDAR device 10 can be reduced because of the mirror 16 with a minimum width.

Figure 8:
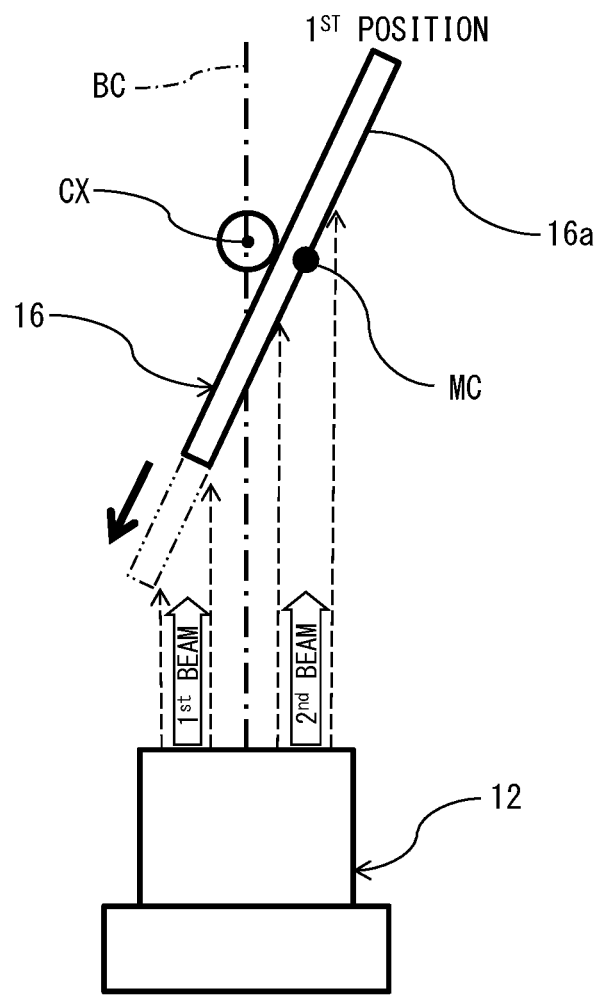
FIG. 8 is a schematic view of a comparative example showing a positional relationship between the light emitting module and the scanning mirror.

On the contrary, if the light emitting module 12 and the scanning mirror 16 are arranged so that the mirror center MC is aligned with the center axis CX as illustrated in FIG. 8, at least the left side of the reflective surface 16a needs to be extended so as to catch the first laser beam when the scanning mirror 16 is at the first position. As a result, the size of the LIDAR device 10 would be increased because of the mirror 16 with an extended width.

In this embodiment, the angle sensor 28 is disposed to detect rotation angles of the scanning mirror 16 and outputs a detection signal at a plurality of predetermined angle intervals (0.1 degree intervals in this embodiment) during each rotation cycle between the first position and the second position of the scanning mirror 16. Then, the controller 21 outputs a control signal to the light emitting module 12 upon receiving the detection signal from the angle sensor 28, as shown in FIG. 6. As a result, the light emitting module 12 can emit a laser beam at the same intervals as the plurality of predetermined angle intervals.

Figure 9:
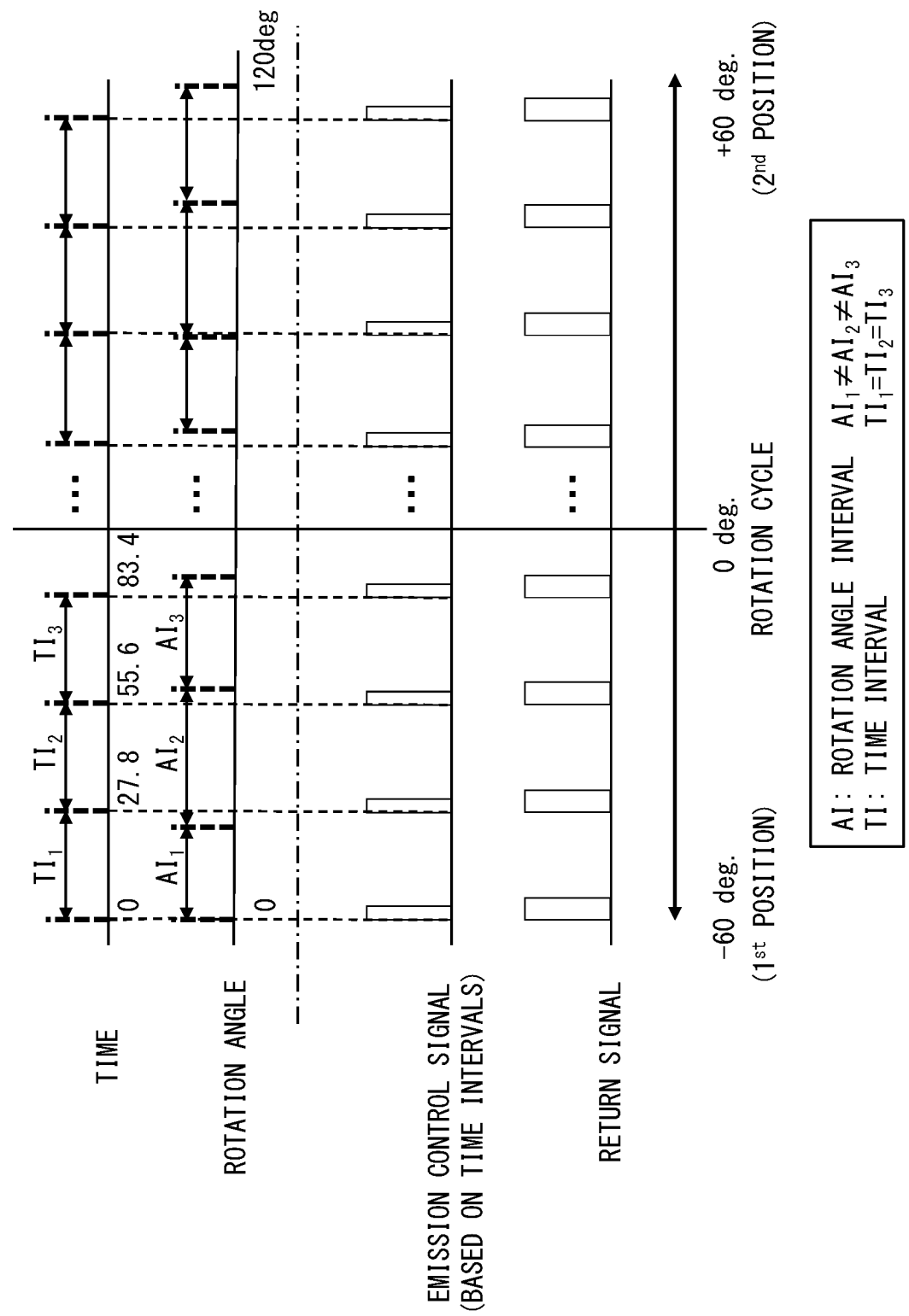
FIG. 9 is a timing chart of a comparative example of detection signals, emission control signals, and return signals.

Here, FIG. 9 shows a comparative example where the light emitting module 12 is controlled to emit a laser beam at a plurality of predetermined "time" intervals (for example, each 27.8 microseconds). Since the scanning mirror 16 swings between the first and second positions, the rotational speed irregularly varies due to an acceleration applied to the mirror 16. Thus, although the light emitting module 12 can emit a laser beam at a predetermined "time" intervals, the light emitting module 12 cannot emit a laser beam at a plurality of predetermined "rotation angle" intervals between the first and second positions. As a result, the amount of laser beams would vary for each region of the scanning zone SZ corresponding to each of the rotational angle intervals.

On the contrary, since the light emitting module 12 is controlled to emit laser beams based on rotation angles, not time intervals, of the scanning mirror 16 detected by the angle sensor 28 according to this embodiment, the LIDAR device 10 can emit a laser beam evenly for each rotational angle interval. Thus, the LIDAR device 10 can scan the scanning zone SZ equally.

The light receiving module 14 includes the integrated circuit 36 on which the controller 21 is implemented. That is, the controller 21 is integrally formed with the light receiver 34 (the SPAD array 34a) in this embodiment, and the distance between the controller 21 and the light receiver 34 can be reduced as compared with a situation where the controller 21 is physically separated away from the light receiver 34. As a result, a required time for transmitting the return signal to the controller 21 from the light receiver 34 can be reduced, and therefore accuracy of the calculated distance can be increased.

The light receiving module 14 includes the plurality of SPADs 38 as light sensitive devices. The SPADs 38 have a sensitivity to receive a return beam with high resolution time intervals. Therefore, the light receiving module 14 can detect a return beam even at small rotation angle intervals (i.e., 0.1 degree in this embodiment), and thus the LIDAR device 10 can finely scan the scanning zone SZ. Furthermore, the SPAD array forms a digital circuit together with the controller 21. Thus, the distance to an object X can be calculated without a processor, which results in reduction of a manufacturing cost of the LIDAR device 10.

In this embodiment, the light emitting module 12 is configured to output the actual emission timing at which the light emitting module 12 actually emits the light beam. Then, the controller 21 corrects the calculated distance using the actual emission timing. Thus, although the distance is calculated using the signal output timing at which the controller 21 output the control signal to the light emitting module 12, and therefore the calculated distance inevitably includes an error generated from the time lag between the signal output timing and the actual emission timing, the error can be corrected, or compensated, using the actual emission timing. As a result, the LIDAR device 10 can obtain a distance to an object X with high accuracy.

Second Embodiment

Next, the second embodiment of the present disclosure is described with reference to FIGS. 10 to 11. In the following description, only different portions from the first embodiment will be described.

In the first embodiment, the controller 21 is configured to output an emission control signal upon receiving a detection signal from the angle sensor 28. In the second embodiment, the controller 21 is configured to, upon receiving the detection signal from the angle sensor 28, output a plurality of control signals to the light emitting module 12 prior to receiving a subsequent one of the detection signal.

Figure 10:
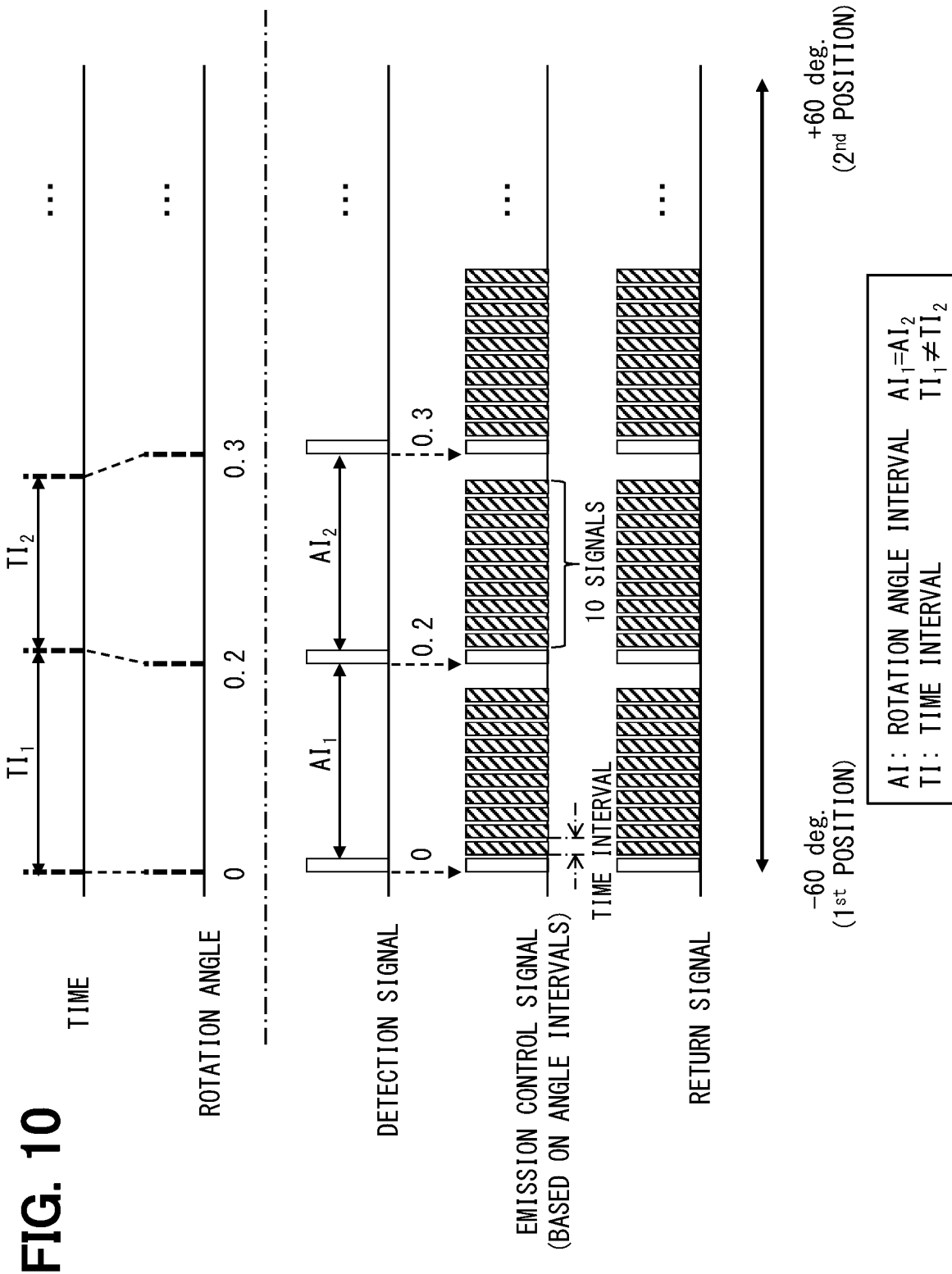
FIG. 10 is a timing chart of detection signals, emission control signals, and return signals according to a second embodiment.

More specifically, as shown in FIG. 10, the controller 21 outputs a predetermined number of control signals within each rotational angle interval (i.e., between when the controller 21 receives a detection signal and when the controller 21 receives a subsequent detection signal). In this embodiment, the number of the control signals output within each rotation angle interval is 10. Furthermore, the controller 21 continuously outputs a control signal at predetermined "time" intervals (not rotational angle intervals) ten times and then stops outputting the control signal when the tenth control signal is outputted.

The controller 21 is further configured to calculate a distance to an object X using a plurality of return signals corresponding to the plurality of control signals for each rotational angle interval. For example, the controller 21 calculates ten distances corresponding to the ten control signals for each rotation angle interval. Then, the controller 21 accumulates the ten distances and obtains an average distance from the ten calculated distances.

Figure 11:
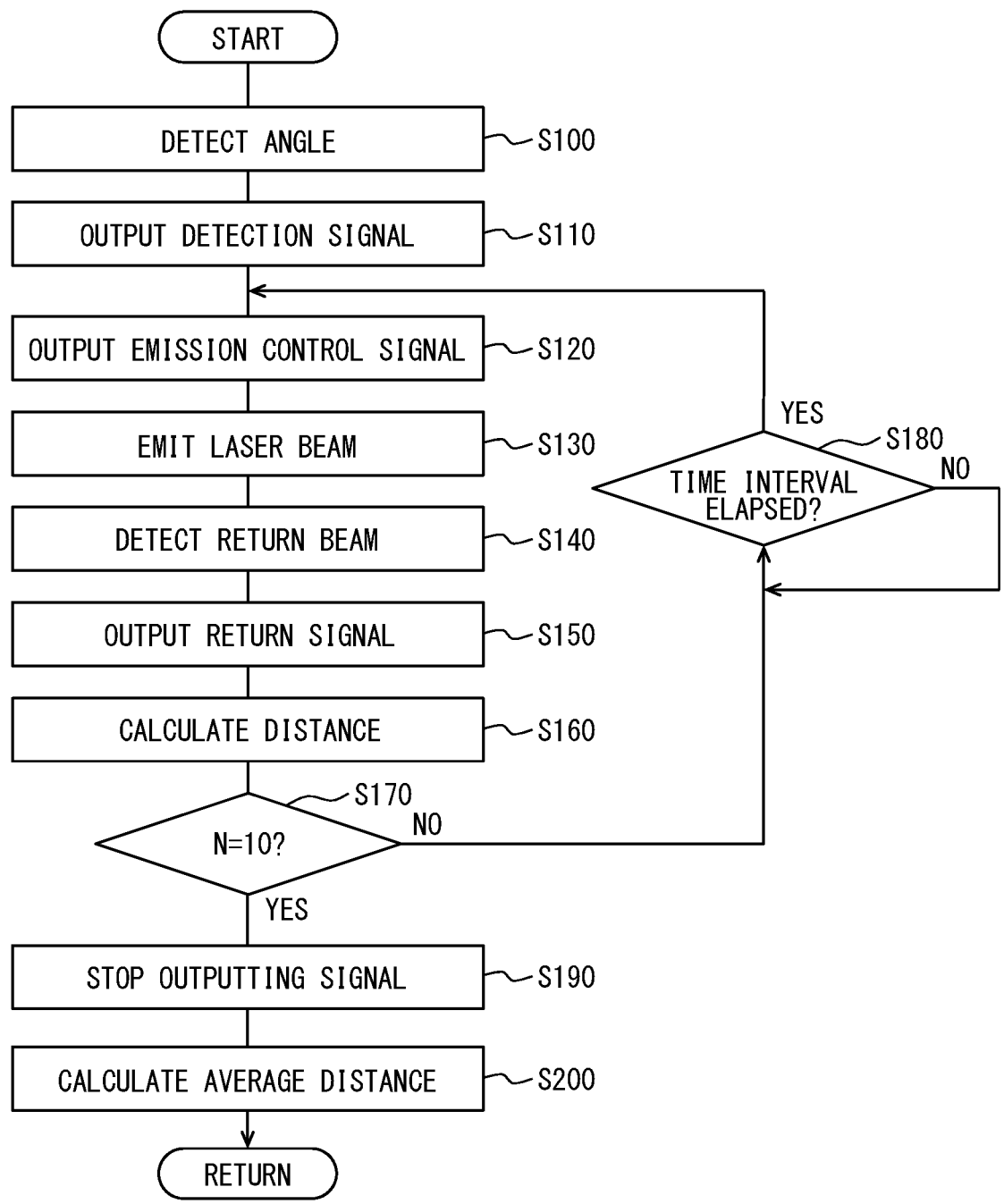
FIG. 11 is a flowchart performed by the LIDAR device according to the second embodiment.

FIG. 11 shows a flowchart of a process performed by the LIDAR device 10 according to the second embodiment. It should be noted that steps for correcting the calculated distance using the actual emission timing (i.e., steps S50 and S90 in FIG. 7) are eliminated in the second embodiment.

When the angle sensor 28 detects a rotation angle of the scanning mirror 16 at step S100, the angle sensor 28 outputs a detection signal indicative of the detected rotation angle to the controller 21 at step S110. When the controller 21 receives the detection signal from the angle sensor 28, the controller 21 outputs an emission control signal to the light emitting module 12 at step S120.

When the light emitting module 12 receives the emission control signal, the light emitting module 12 emits a laser beam toward the scanning mirror 16 at step S130. The emitted laser beam is reflected at the reflected surface of the scanning mirror 16 and travels to the scanning zone SZ. Then, if the laser beam is reflected by an object X, the return beam comes back to the LDIAR device and is reflected again by the reflective surface 16a of the scanning mirror 16 toward the light receiving module 14. When the return beam reaches the light receiving module 14, the light receiving module 14 detects the return beam at step S140, and then the light receiving module 14 outputs a return signal to the controller 21 at step S150 in response to receiving the return beam.

The controller 21 calculates a distance to the object X using the signal output timing and the return signal at step S160. Then, the controller 21 determines whether the number of the emission control signals emitted after receiving the detection signal is ten at step S170. If the number is not ten (step S170: No), the process proceeds to step S180, and the controller 21 determines whether a predetermined time interval (for example, 3 microseconds) has elapsed after outputting the emission control signal. If the time interval has not elapsed (step S180: No), the controller 21 repeats step S180. If the time interval has elapsed (step S180: Yes), the process proceeds to step S120 and the controller 21 outputs again an emission control signal. Then, the process repeats steps S120 to S160, and the controller 21 determines whether the number of the emitted emission control signals is ten. If Yes at step S170, the controller 21 stops outputting an emission control signal at step S190, and then calculates an average distance from the ten calculated distances at step S200. Then, the process returns to step S100.

As described above, the LIDAR device 10 according to the second embodiment outputs a plurality of emission control signals upon receiving a detection signal from the angle sensor 28 until receiving a subsequent detection signal. Then, the controller 21 calculates a plurality of distances to an object X based on a plurality of return signals corresponding to the plurality of emission control signals, and obtains an average distance from the plurality of calculated distances. Therefore, the LIDAR device 10 can obtain a distance to an object X with high accuracy.

Third Embodiment

Figure 12:
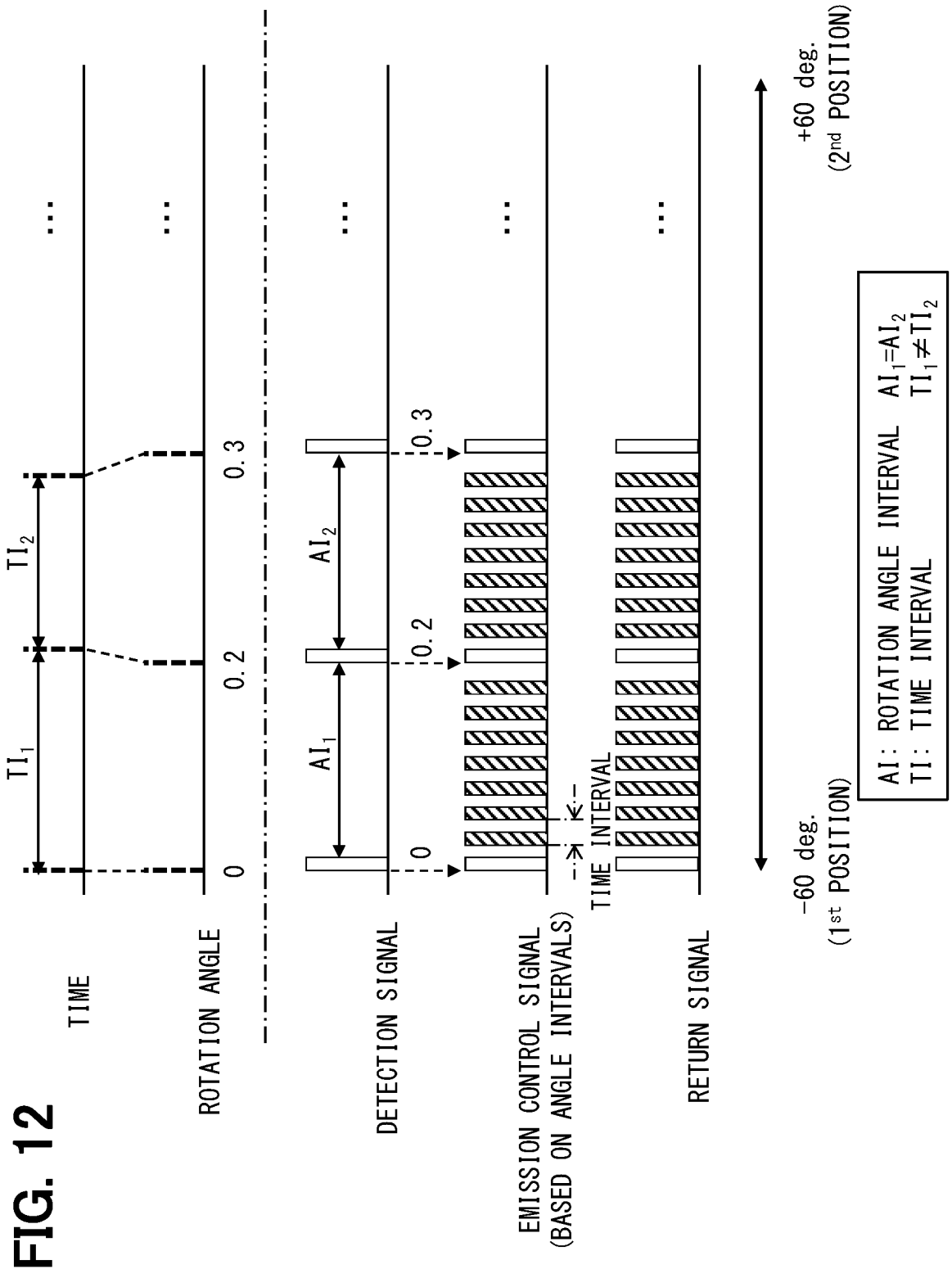
FIG. 12 is a timing chart of detection signals, emission control signals, and return signals according to a third embodiment.

Next, the third embodiment of the present disclosure is described with reference to FIGS. 12 to 13. In the following description, only different portions from the first and second embodiments are described.

In the second embodiment, the controller 21 is configured to output a predetermined number (for example, ten) of emission control signals after receiving a detection signal until receiving a subsequent detection signal. In the third embodiment, the controller 21 is configured to continuously output emission control signals at predetermined time intervals after receiving a detection signal until receiving a subsequent detection signal (see FIG. 14).

As with the second embodiment, the controller 21 calculates a plurality of distances to an object X for each rotation angle interval based on a plurality of return signals corresponding to the plurality of emission control signals, and then obtains an average distance from the plurality of calculated distances.

Figure 13:
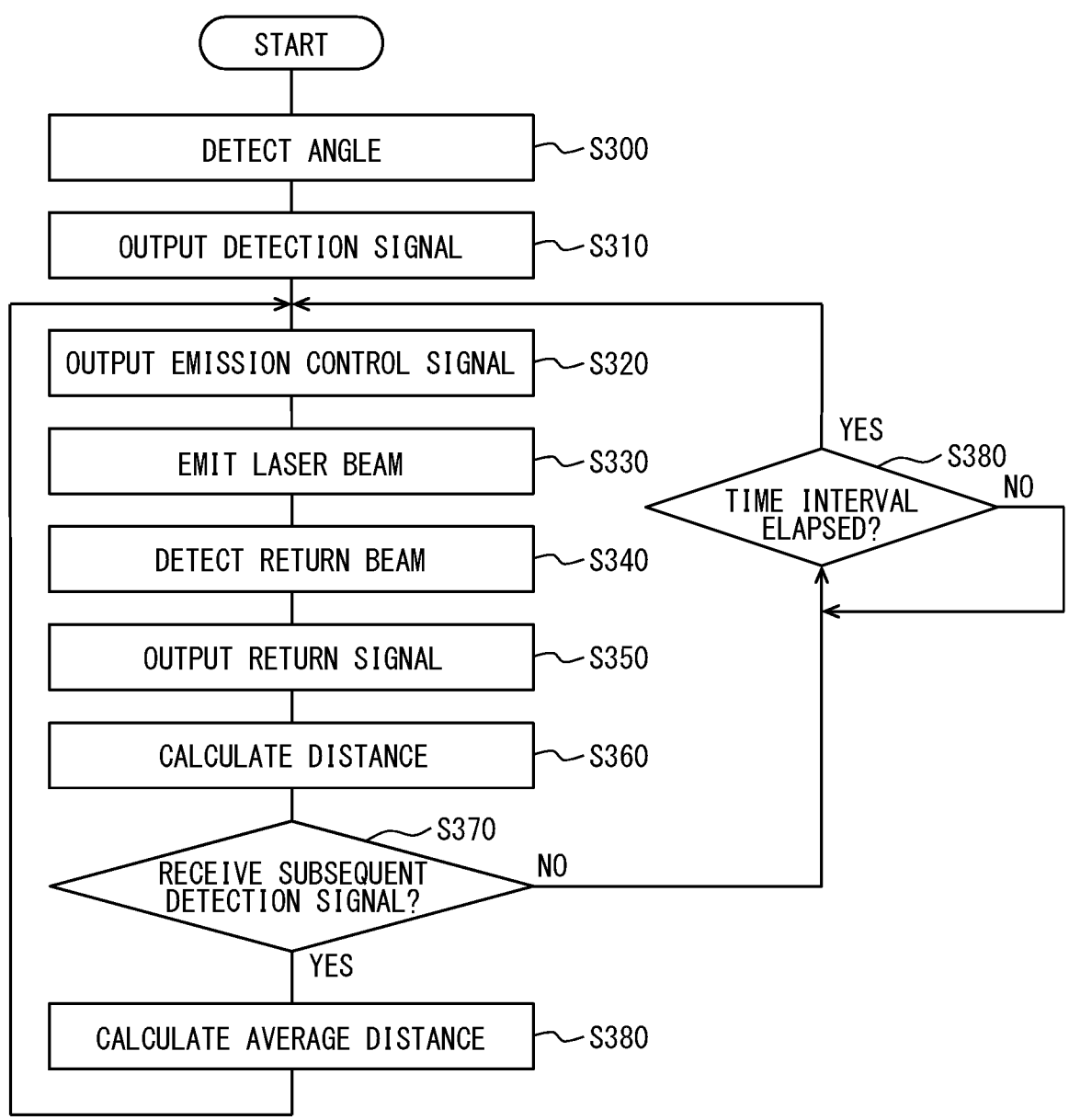
FIG. 13 is a flowchart performed by the LIDAR device according to the third embodiment.

FIG. 13 shows a flowchart of a process performed by the LIDAR device 10 according to the second embodiment. It should be noted that, as with the second embodiment, steps for correcting the calculated distance using the actual emission timing (i.e., steps S50 and S90 in FIG. 7) are eliminated in the third embodiment.

When the angle sensor 28 detects a rotation angle of the scanning mirror 16 at step S300, the angle sensor 28 outputs a detection signal indicative of the detected rotation angle to the controller 21 at step S310. When the controller 21 receives the detection signal from the angle sensor 28, the controller 21 outputs an emission control signal to the light emitting module 12 at step S320. When the light emitting module 12 receives the emission control signal, the light emitting module 12 emits a laser beam toward the scanning mirror 16 at step S330.

When the return beam reaches the light receiving module 14, the light receiving module 14 detects the return beam at step S340, and then the light receiving module 14 outputs a return signal to the controller 21 in response to receiving the return beam at step S350.

The controller 21 calculates a distance to the object X using the signal output timing and the return signal at step S360. Then, the controller 21 determines whether the controller 21 receives a subsequent detection signal from the angle sensor 28 after receiving the previous detection signal at S370. If step S370 is No, the process proceeds to step S380, and then the controller 21 determines whether a predetermined time interval (for example, 3 microseconds) has elapsed after outputting the emission control signal. If the time interval has not elapsed (step S380: No), the controller 21 repeats step S380. If the time interval has elapsed (step S380: Yes), the process returns to step S320 and the controller 21 outputs again an emission control signal. Then, the process repeats steps S320 to S370, and the controller 21 output a plurality of emission control signals at the predetermined time intervals until receiving the subsequent detection signal.

If the controller 21 determines that the controller 21 receives the subsequent detection signal from the angle sensor 28 (step S370: Yes), the controller 21 calculates an average distance from the plurality of calculated distances at step S380. Then, the process returns to step S320, and the controller 21 outputs again a plurality of emission control signals at the predetermined time intervals by repeating steps S320 to S370.

As described above, the LIDAR device 10 according to the third embodiment continuously outputs a plurality of emission control signals at predetermined time intervals for each rotation angle interval. Then, the controller 21 calculates a plurality of distances to an object X for each rotation angle interval based on a plurality of return signals corresponding to the plurality of emission control signals, and obtains an average distance from the plurality of calculated distances. Therefore, as with the second embodiment, the LIDAR device 10 can obtain the distance to an object X with high accuracy.

Fourth Embodiment

Figure 14:
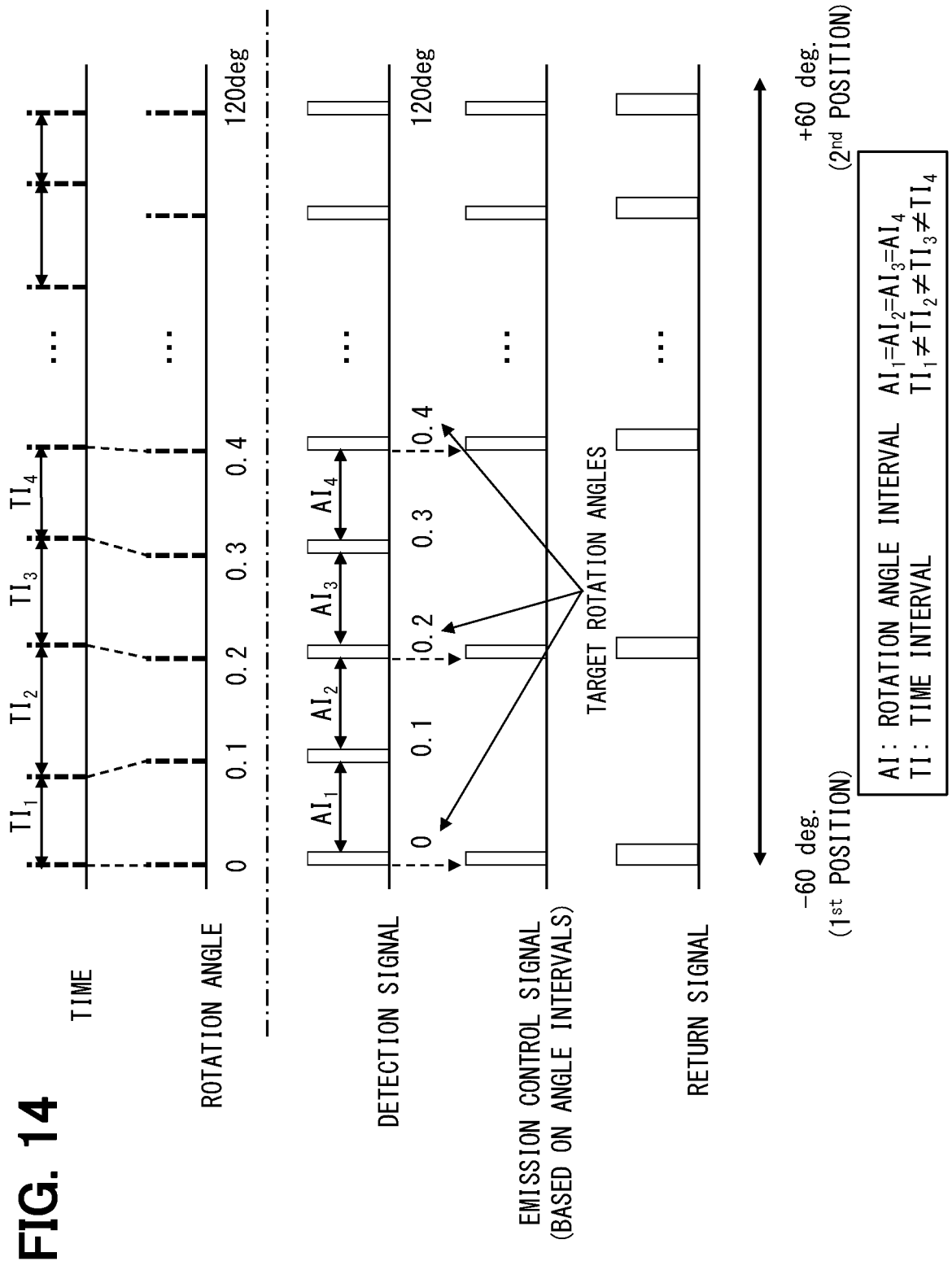
FIG. 14 is a timing chart of detection signals, emission control signals, and return signals according to a fourth embodiment.

Next, the fourth embodiment of the present disclosure is described with reference to FIGS. 14 to 15. In the following description, only different portions from the first to third embodiments are described.

In the first embodiment, the controller 21 is configured to automatically output an emission control signal upon receiving a detection signal from the angle sensor 28. In the fourth embodiment, the controller 21 is configured to output an emission control signal if the detection signal (the rotation angle) matches any one of a plurality of target rotation angles (see FIG. 14). In this embodiment, the target rotation angles are set to 0.0, 0.2, 0.4, 0.6, . . . , 120.00 degree, for example.

Figure 15:
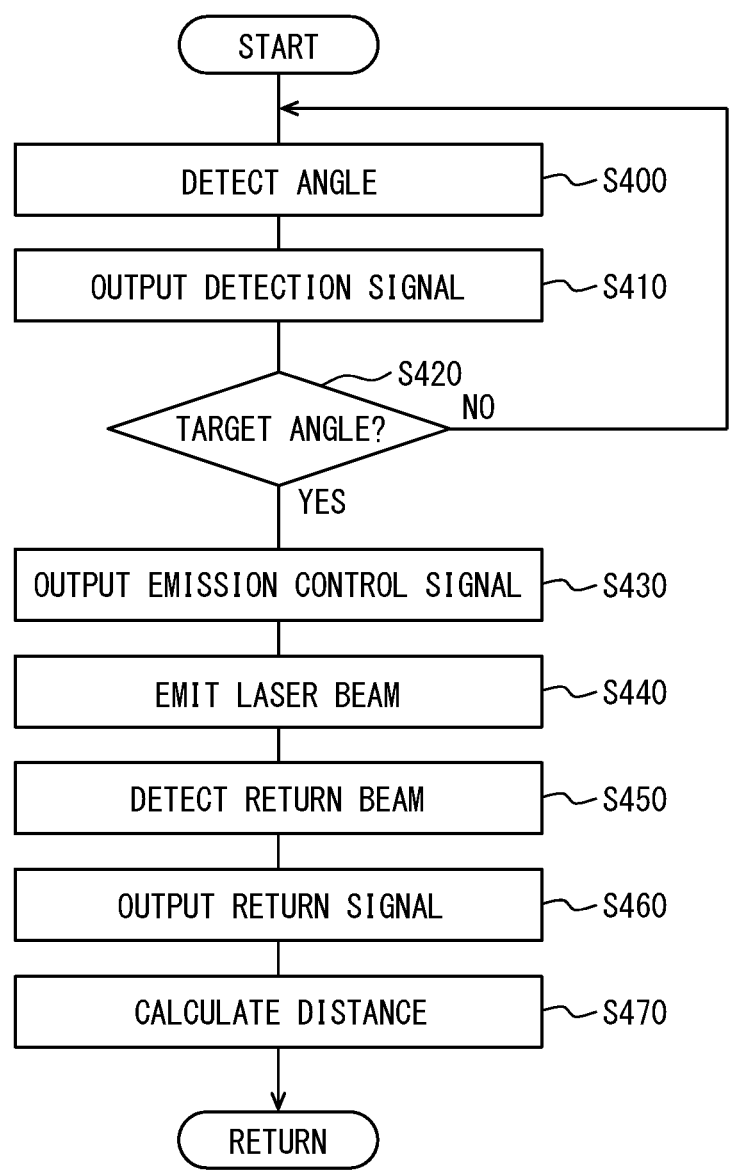
FIG. 15 is a flowchart performed by the LIDAR device according to the fourth embodiment.

FIG. 15 shows a flowchart of a process performed by the LIDAR device 10 according to the fourth embodiment. It should be noted that steps for correcting the calculated distance using the actual emission timing (i.e., steps S50 and S90 in FIG. 7) are eliminated in the fourth embodiment.

When the angle sensor 28 detects a rotation angle of the scanning mirror 16 at step S400, the angle sensor 28 outputs a detection signal indicative of the detected rotation angle to the controller 21 at step S410. When the controller 21 receives the detection signal from the angle sensor 28, the controller 21 determines whether the detection signal matches any one of the target rotation angles at step S420. If No at step S420, the process returns to step S400 and repeats steps S410 to S420. If Yes at step S420, the controller 21 outputs an emission control signal to the light emitting module 12 at step S430.

When the light emitting module 12 receives the emission control signal, the light emitting module 12 emits a laser beam toward the scanning mirror 16 at step S440. Accordingly, the LIDAR device 10 can emit a laser beam when the scanning mirror 16 is at a desired rotation angle. When the return beam reaches the light receiving module 14, the light receiving module 14 detects the return beam at step S450, and then the light receiving module 14 outputs a return signal to the controller 21 in response to receiving the return beam at step S460.

The controller 21 calculates a distance to the object X using the signal output timing and the return signal at step S470. Then, the process returns to step S400 and repeats steps S410 to S470.

As described above, the LIDAR device 10 according to the fourth embodiment outputs an emission control signal when the rotation angle matches any one of the plurality of target rotation angles. Thus, the LIDAR can emit a laser beam toward a desired area in the scanning zone SZ accurately.

In the above-described fourth embodiment, the target rotational angles are set in a regular manner (e.g., 0.0, 0.2, 0.4, etc.). However, the target rotational angles may be set in an irregular manner using, for example, a predetermined target angle table stored in at least one memory. In such a case, at least one processor may be used to determine whether the detection signal (the rotational angle) matches a target rotation angle.

Fifth Embodiment

Next, the fourth embodiment of the present disclosure is described with reference to FIGS. 16 to 18. In the following description, only different portions from the first to fourth embodiments are described. In the above-described embodiments, the LIDAR device 10 emits a laser light in a constant manner for each rotation angle interval (for example, one laser beam is emitted for each rotation angle in the first embodiment and a plurality of laser beams are emitted for each rotation angle in the second and third embodiments). In the fifth embodiment, the LIDAR device 10 is configured to emit a laser beam in a different manner for a specific target area within the scanning zone SZ the remaining area.

In this embodiment, a specific rotation angle range of the scanning mirror 16 corresponding to the target area is defined in the rotation angle range (for example, $-20° \leq$ specific rotation angle $\theta s \leq +20°$). As shown in FIG. 17, the light emitting module 12 is configured to emit a laser beam in a different manner within the rotational angle range than the other rotational angle range (i.e., $-60° \leq \theta < -20°$ and $+20° < \theta \leq +60$). For example, the light emitting module 12 is controlled to emit a predetermined number of laser beams (e.g., 10) for each rotational angle interval within the specific rotation angle range. Hereinafter, the rotation angle range of the scanning mirror 16 other than the specific rotation angle range is referred to as a regular range within which the light emitting module 12 is controlled to emit a laser beam upon receiving the detection signal from the angle sensor 28 as with the first embodiment.

Figure 16:
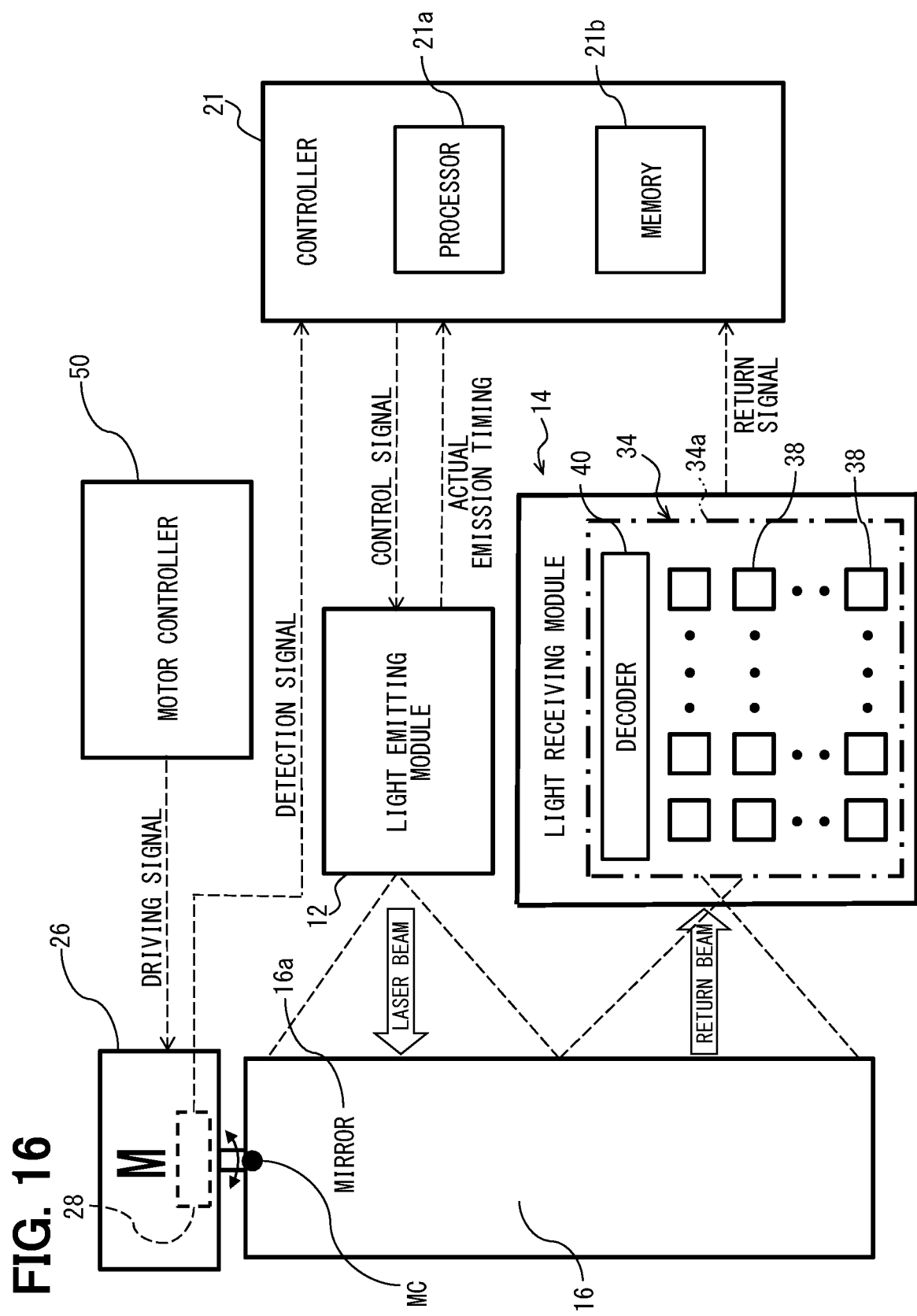
FIG. 16 is a block diagram of the LIDAR device according to a fifth embodiment.
Figure 17:
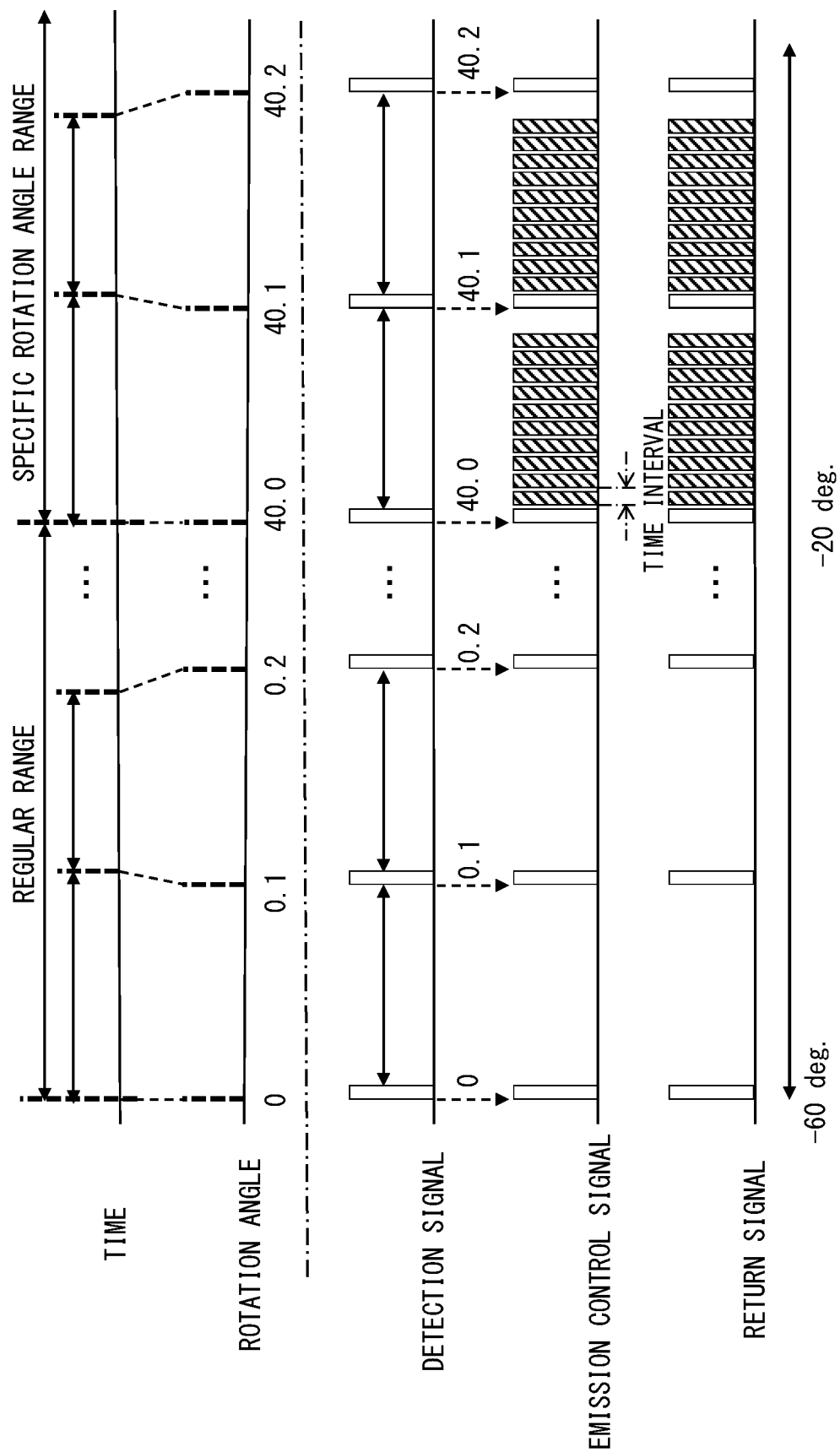
FIG. 17 is a timing chart of detection signals, emission control signals, and return signals according to the fifth embodiment.

In this embodiment, the controller 21 is separately provided with the light receiving module 14 as shown in FIG. 16. That is, the light receiving module 14 does not integrally include the controller 21 as described in the first embodiment. The controller 21 is an electronic control unit (ECU) that includes at least one processor 21a and at least one memory 21b instead of, or in combination of, at least one circuit in this embodiment. The memory 21b includes random access memory, read only memory, flash memory, or a combination of these. The memory 21b has stored thereon instructions which, when executed by the processor 21a, cause the processor 21a to perform a variety of tasks as will be described later. The memory 21b also has stores the specific rotational angle range.

Figure 18:
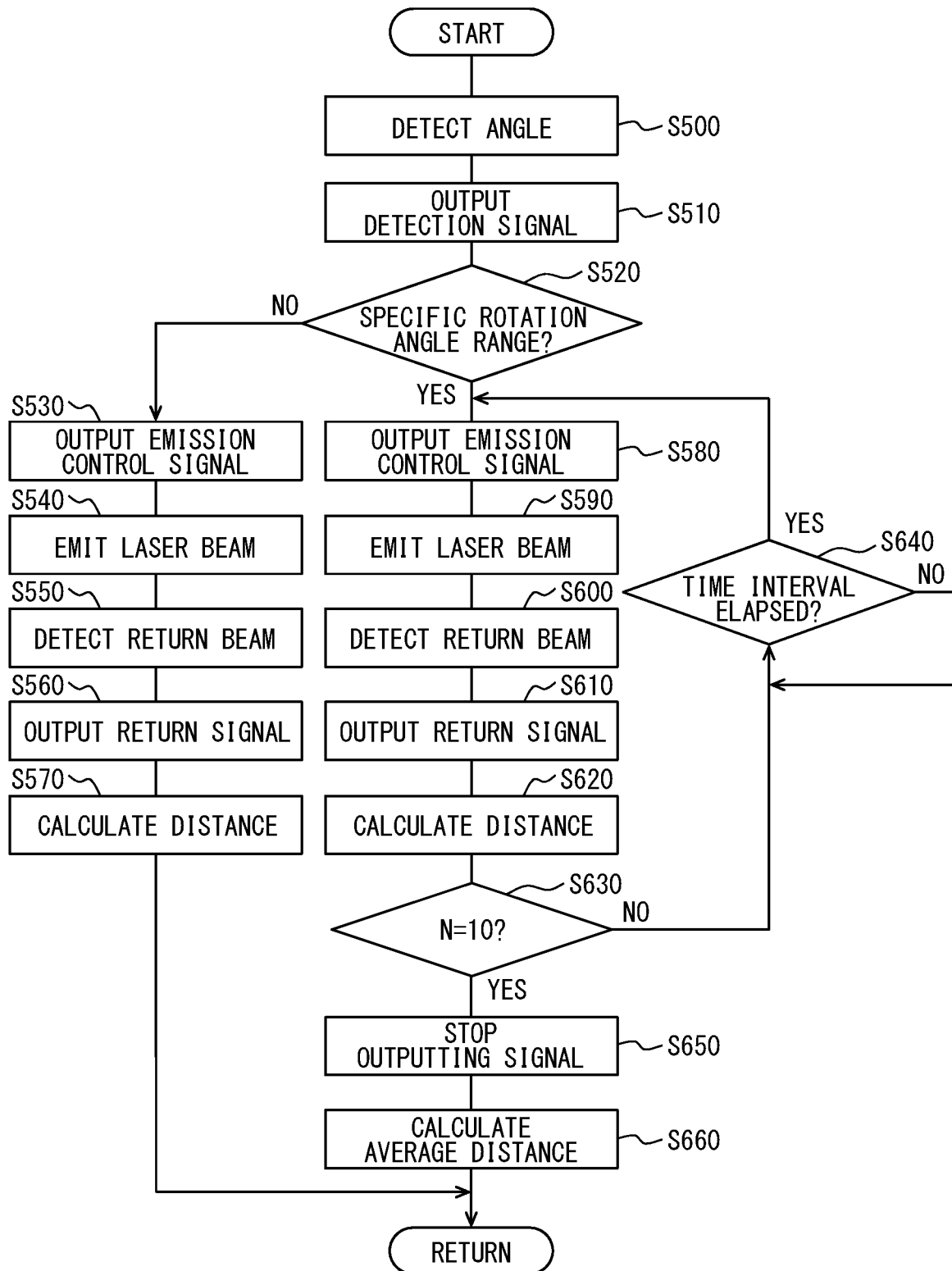
FIG. 18 is a flowchart performed by the LIDAR device according to the fifth embodiment.

FIG. 18 shows a flowchart executed by the LIDAR device 10 according to this embodiment. It should be noted that steps for correcting the calculated distance using the actual emission timing (i.e., steps S50 and S90 in FIG. 7) are eliminated in the second embodiment.

When the angle sensor 28 detects a rotation angle of the scanning mirror 16 at step S500, the angle sensor 28 outputs a detection signal at step S510. When the controller 21 receives the detection signal from the angle sensor 28, the controller 21 (the processor 21a) determines whether the rotation angle of the scanning mirror 16 is within the specific rotation angle range at step S520. If No at step S520 (the rotation angle is within the regular range), the process proceeds to step S530, and the controller 21 outputs an emission control signal. Accordingly, the controller 21 outputs an emission control signal upon receiving the detection signal when the rotation angle of the scanning mirror 16 is within the regular angle.

When the light emitting module 12 receives the emission control signal, the light emitting module 12 emits a laser beam toward the scanning mirror 16 at step S540. Then, when the return beam reaches the light receiving module 14, the light receiving module 14 detects the return beam at step S550, and then the light receiving module 14 outputs a return signal to the controller 21 at step S560 in response to receiving the return beam.

The controller 21 calculates a distance to an object X using the signal output timing and the return signal at step S570. Then the process returns to step S500. In this way, when the rotation angle is within the regular range, a distance to the object X is calculated for each rotation angle interval.

If the controller 21 determines that the rotation angle is within the specific rotation angle range at step S520 (step S520: Yes), the process proceeds to step S580, and then the controller 21 outputs an emission control signal at step S580. When the light emitting module 12 receives the emission control signal, the light emitting module 12 emits a laser beam toward the scanning mirror 16 at step S590. Then, when the return beam reaches the light receiving module 14, the light receiving module 14 detects the return beam at step S600, and then the light receiving module 14 outputs a return signal to the controller 21 at step S610 in response to receiving the return beam.

If the controller 21 receives the return signal, the controller 21 calculates a distance to the object X using the return signal at step S620. Then, the controller 21 determines whether the number of emission of the emission control signal after receiving the detection signal is ten at step S630. If No at step S630, the process proceeds to step S640, and the controller 21 determines whether a predetermined time interval (for example, 3 microseconds) has elapsed after outputting the emission control signal. If the time interval has not elapsed (step S640: No), the controller 21 repeats step S640. If the time interval has elapsed (step S640: Yes), the process proceeds to step S580 and the controller 21 outputs again an emission control signal. Then, the process repeats steps S590 to S620, and the controller 21 determines whether the number of the emitted emission control signals is ten at S630. If Yes at step S630, the controller 21 stops outputting an emission control signal at step S650, and then calculates an average distance from the ten calculated distances at step S660. Then, the process returns to step S500.

Accordingly, when the rotation angle is within the specific rotation angle range, the controller 21 outputs ten emission control signals for each rotation angle interval. The controller 21 calculates ten distances based on ten return signals corresponding to the ten emission control signals. Then, the controller 21 obtains an average distance from the ten calculated distances for each rotation angle interval within the specific rotation angle range. Therefore, the LIDAR device 10 according to the fifth embodiment can finely scan a specific area of the scanning zone SZ and obtain a distance to an object X with high accuracy for such a specific area.

Modifications to Embodiments

Several modifications may be applied to the above-described embodiments.

For example, in the embodiments described above, the light emitting module is configured to emit two laser beams from two light emitting elements. However, the light emitting module may emit a laser beam from a single light emitting element or three or more laser beams from three or more light elements.

In the above-described embodiments, the light emitting module is configured to emit laser light during the entire cycle of the scanning mirror (i.e., one way from the first positon to the second position and the other way from the second position to the first position). However, the light emitting module may be configured to emit laser light during only one way of the scanning mirror. For example, the light emitting module may be controlled to emit laser lights only when the mirror is swinging from the first position to the second position. In this case, the mirror is quickly returned back to the first position immediately after the mirror moved to the second position.

In the above-described embodiments, the light receiver includes a plurality of SPADs. However, other light sensitive elements may be used. However, if SPADs are used as a light receiver, since the SPADs can output a digital signal, there is no need to use a processor to calculate a distance to an object as described above.

In this application, the terms "module" and "system" may include hardware components such as housings, fixtures, wiring, etc. In addition, in this application, the term "processor" may refer to, be part of, or include circuits or circuitry that may include processing core hardware (shared, dedicated, or group) that executes code and memory hardware (shared, dedicated, or group) that stores code executed by the processing core hardware. As such, the term "processor" may be replaced by the term "circuit".

The method steps, processes, and operations described herein are not to be construed as necessarily requiring their performance in the particular order discussed or illustrated, unless specifically identified as an order of performance. It is also to be understood that additional or alternative steps may be employed.

Although the terms "first", "second", "particular", etc. are be used to describe various elements, these terms may be only used to distinguish one element from another. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "front", "rear," "left", "right", and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the sensor system in the figures is rotated, elements described as "front/rear" would then be oriented "left/right" with respect to the vehicle. Thus, the example term "front" can encompass any direction in practice. The device may be otherwise oriented (rotated 90 degrees or at other orientations) and the spatially relative descriptors used herein interpreted accordingly.

The invention claimed is:

1. A LIDAR device for measuring a distance to an object in a predetermined scanning zone, the device comprising:
   a light source configured to emit a light beam having a predetermined light beam width for scanning the scanning zone, the light beam including at least a first light beam and a second light beam;
   a mirror that has a reflective surface and a back surface opposite to the reflective surface, the mirror configured to reflect, with the reflective surface, the light beam emitted from the light source toward the scanning zone;
   a rotatable shaft having a center axis parallel to the reflective surface of the mirror, the shaft being connected to the back surface of the mirror; and
   a motor configured to rotate the shaft to cause the mirror to swing between a first position corresponding to one end of the predetermined scanning zone and a second position corresponding to another end of the predetermined scanning zone, an angle of incidence of the light beam to the reflective surface being greater when the mirror is at the first position than when the mirror is at the second position, wherein:
   when a light beam center is defined as a center of the light beam width of the light beam from the light source to the reflective surface, then a motion area is defined as one side of the light beam center that includes the center axis of the shaft,
   the light source and the mirror are arranged to have a positional relationship such that, when viewed in a direction along the center axis of the shaft, a mirror center, which is defined as a point on the reflective surface closest to the center axis of the shaft, is aligned with the light beam center when the mirror is at the first position, and the mirror center shifts within the motion area when the mirror is swinging between the first position, non-inclusive, and the second position, inclusive,
   the reflective surface has a pair of edge portions that are opposite to each other in a width direction of the mirror,
   the first light beam and the second light beam are reflected by the pair of edge portions when the mirror is at the first position,
   the light source includes two light emitting elements that collectively emit the light beam,
   the reflective surface has a rectangular shape and includes a center portion including the mirror center and the pair of edge portions extending in a direction along the center axis, and
   the light beam from the two light emitting elements is reflected by the mirror at the center portion when the mirror is at the second position.

2. The LIDAR device according to claim 1, wherein the mirror center is a center between the pair of edge portions.

3. The LIDAR device according to claim 1, further comprising
   a controller configured to control the motor to swing the mirror between the first position and the second position.

4. The LIDAR device according to claim 1, wherein the rotatable shaft has a columnar shape and includes a side surface that is connected to the back surface of the mirror.

* * * * *